United States Patent [19]

Gotoh

[11] Patent Number: 4,747,205

[45] Date of Patent: May 31, 1988

[54] METHOD OF PRODUCING A MOTOR FRAME FOR AN ELECTRIC MOTOR

[75] Inventor: Tohru Gotoh, Nagoya, Japan

[73] Assignee: Mitsubishi Denki Kabushiki Kaisha, Tokyo, Japan

[21] Appl. No.: 928,402

[22] Filed: Nov. 10, 1986

[30] Foreign Application Priority Data

Nov. 8, 1985 [JP] Japan .................. 60-250030

[51] Int. Cl.$^4$ .................................. H02K 15/14
[52] U.S. Cl. .................................. 29/596; 219/86.1; 219/117.1; 310/89
[58] Field of Search .................. 29/596, 598; 228/232, 228/155; 310/42, 64, 85, 89; 219/91.2, 92, 86.1, 87, 107, 117.1

[56] References Cited

U.S. PATENT DOCUMENTS 2,599,045  6/1952  Brolaski ................ 219/91.2 X
4,604,512  8/1986  Stacey ................... 219/60.2 X

FOREIGN PATENT DOCUMENTS 0037860  3/1984  Japan ........................ 310/64

OTHER PUBLICATIONS

Welding Technique 1983 (Nov.) vol. 31, by Welding Technique ISSN, p. 90.
"Recent Welding Technique in USSR: A Report of the First Inquiry Commission on Technological Communication of Welding Technique of USSR (No. 2)", T. Nakamura.

Primary Examiner—Carl E. Hall
Attorney, Agent, or Firm—Oblon, Fisher, Spivak, McClelland & Maier

[57] ABSTRACT

A method of producing a motor for electric motor comprises a step of forming a heat radiation fin by bending a rectangular metallic plate, a step of forming a dummy fin having electrical conductivity, a step of disposing the heat radiation fin and the dummy fin on the outer circumferential surface of a frame body which has been formed in a cylindrical form so as to be symmetrical with respect to the axial centerline of the frame body, a step of disposing upper and lower core electrodes in the frame body so as to be in contact with the inner circumferential surface of the frame body and to respectively oppose the heat radiation fin and the dummy fin, a step or respectively connecting movable and stationary electrodes to the heat radiation fin and the dummy fin, and a step of melt-bonding only the heat radiation fin to the frame body by projection welding.

3 Claims, 1 Drawing Sheet

METHOD OF PRODUCING A MOTOR FRAME FOR AN ELECTRIC MOTOR

BACKGROUND OF THE INVENTION

1. Field of the Invention:

The present invention relates to a method of producing a motor frame with heat radiation fins used for an electric motor.

2. Background Art:

Generally, the operation of an electromagnetic apparatus causes a temperature rise due to internal power loss. In an electric motor, a plurality of heat radiation fins are attached onto the outer circumferential surface of the frame body to increase the surface area of contact between air and the frame body. The heat radiation fins function to release heat produced in the motor to the outside to thereby prevent the temperature rise.

The motor frame used for the electric motor of this kind is manufactured by disposing heat radiation fins on the outer circumferential surface of the frame body previously formed in a cylindrical shape and by bonding the heat radiation fins to the frame body by projection welding. In this case, the projection welding is carried out simultaneously for a pair of the heat radiation fins placed on the frame body at positions about 180° apart from each other in the circumferential direction of the frame body so that a thermal stress produced in the frame body is dispersed.

The frame body is provided with a base portion for stably positioning the electric motor in place and a hanger ring for hanging and transferring the electric motor. In this case, it is unnecessary to bond by welding one of the pair of the heat radiation fins at the position where the base portion or the hang ring is formed. Therefore, the heat radiation fins are not simultaneously welded at symmetric positions with the result of a problem of the thermal stress produced in the frame body.

SUMMARY OF THE INVENTION

It is an object of the present invention to provide a method of producing a motor frame for an electric motor for minimizing a thermal stress produced in the frame body at the time of welding of the heat radiation fins.

The foregoing and the other objects of the present invention have been attained by providing a method of producing a motor frame for an electric motor which comprises a step of forming a heat radiation fin by bending a rectangular metallic plate, a step of forming a dummy fin having electrical conductivity, a step of disposing the heat radiation fin and the dummy fin on the outer circumferential surface of a frame body which has been formed in a cylindrical form so as to be symmetric with respect to the axial center line of the frame body, a step of disposing upper and lower core electrodes in the frame body so as to be in contact with the inner circumferential surface of the frame body and to respectively oppose the heat radiation fin and the dummy fin, a step of respectively connecting movable and stationary electrodes to the heat radiation fin and the dummy fin, and a step of melt-bonding only the heat radiation fin to the frame body by projection welding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Preferred embodiments of the present invention will be described with reference to the accompanying drawings.

Figure 1:
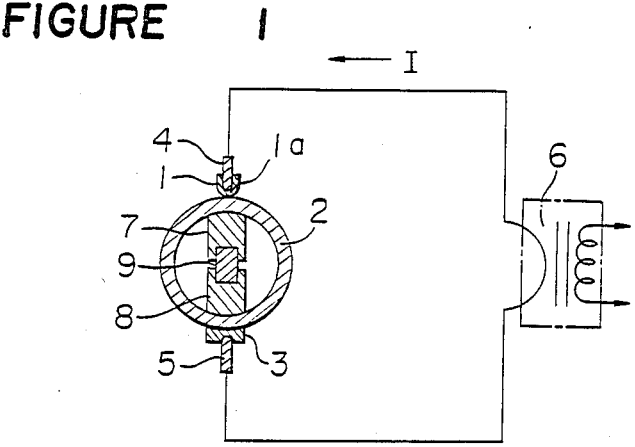
FIG. 1 is a diagram showing an embodiment of the method of producing a motor frame for an electric motor according to the present invention.
Figure 2:
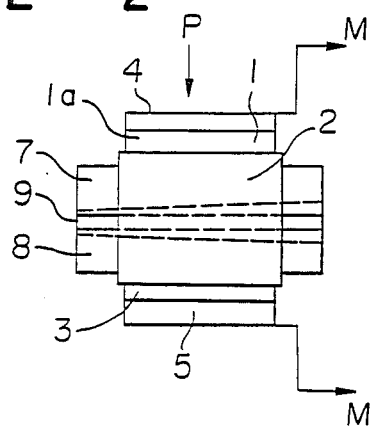
FIG. 2 is a side view schematically illustrated of the frame body to which the method of the present invention is applied.

In FIGS. 1 and 2, a reference numeral 1 designates a heat radiation fin having a bent portion 1a. The heat radiation fin 1 is formed by bending a rectangular metallic plate into a U-shape in cross section and attaching it by projection welding onto the outer circumferential surface of a cylindrical frame body 2. A numeral 3 designates a dummy fin placed on the outer circumferential surface of the frame body at a position 180° apart from the heat radiation fin 1 in the circumferential direction of the frame body 2. The dummy fin 3 is in a form of a block made of copper or a copper alloy and has a shape in conformity with the shape of the contacting part of a stationary electrode 5 which is connected to a welding machine 6, and a surface shaped to fit the frame body 2, said surface having an area greater than that of the bent portion 1a. A movable electrode is also connected to the welding machine 6 and is to be fitted in the U-shaped recess of the heat radiation fin 1. The movable electrode 4 is so constructed that a pressure P is applied to it when the projection welding is carried out. Numerals 7 and 8 respectively designate upper and lower core electrodes placed in the frame body 2 so that the outer part of each of the elctrodes 7, 8 comes to contact with the inner circumferential surface of the frame body by inserting a taper key 9 therebetween. In FIG. 2, symbols M designate the directions of connection of the movable and stationary electrodes 4, 5 to the welding machine 6.

An embodiment of the method of producing the motor frame having the above-mentioned construction will be described.

A rectangular metallic plate is bent to form the heat radiation fin 1 having a U-shape in cross-section. The motor frame 2 is prepared by rolling a rectangular metallic plate in a cylindrical form.

The heat radiation fin 1 and the dummy fin 3 are positioned on the outer circumferential surface of the cylindrical frame body 2 so that they are in close-contact with the outer circumferential surface and are placed at symmetric positions with respect to the axial centerline. The movable electrode 4 and the stationary electrode 5 are respectively brought into contact with a recess formed in each of the heat radiation fin 1 and the dummy fin 3. The upper and lower core electrodes 7, 8 are inserted in the frame body 2 and the taper key 9 is put between the core electrodes to make them in contact with the inner circumferential surface of the frame body 2 before or after attachment of the movable and stationary electrodes 4, 5 to the heat radiation fin 1 and the dummy fin 3. Then, a compressing force P is applied to the movable elctrode 4 in the direction indicated by an arrow mark in FIG. 2 and an electric current I is fed from the welding machine 6 in the direction as shown by an arrow mark in FIG. 1, the current I having a value such that only the heat radiation fin 1 and not the dummy fin 3 is bonded to the frame body 2 by the projection welding. The bonding of the heat radiation fin 1 is successively carried out in the above-mentioned manner. Thus, a motor frame with a number of heat radiation fins 1 can be certainly manufactured.

In the method of producing the motor frame according to the present invention, when a single one of the heat radiation fin 1 is to be attached to the frame body 2 by the projection welding, the dummy fin 3 is disposed at a symmetric position to the heat radiation fin 1 with respect to the axial centerline of the frame body 2 with the result that the thermal stress produced at the time of welding can be dispersed.

Figure 3:
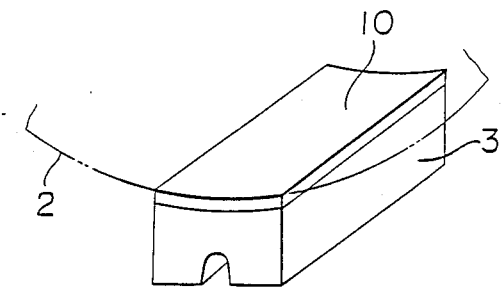
FIG. 3 is a perspective view of an embodiment of one of the electrodes used for the present invention.

In the embodiment described foregoing, the dummy fin 3 is in direct-contact with the outer circumferential surface of the frame body 2. However, this method is not critical, but it is possible that a flexible or soft conductive material 10 such as a thin metallic sheet or laminated thin metallic sheets of copper, or a twisted wire or strip of copper is interposed between the frame body 2 and the dummy fin 3 so as assure in close-contact as shown in FIG. 3. By using the flexible or soft conductive material 10, the dummy fin 3 is kept in close-contact with the frame body 2, and an undesirable trace of current conduction is prevented to thereby provide excellent appearance of the frame body after the welding.

As described above, in accordance with the present invention, the heat radiation fin and the dummy fin are disposed on the outer circumferential surface of the cylindrical frame body at the symmetric position with respect to the axial center of the frame body, followed by subjecting the heat radiation fin and the frame body to the projection welding. Accordingly, the thermal stress produced at the time of welding can be dispersed to thereby minimize the deformation of the frame body.

Further, the method of the present invention provides a motor frame of excellent appearance.

What is claimed is:

1. A method of producing a motor frame for an electric motor which comprises:
    a step of forming a heat radiation fin by bending a rectangular metallic plate,
    a step of forming a dummy fin from a material having electric conductivity,
    a step of disposing the heat radiation fin and the dummy fin on the outer circumferential surface of a frame body which has been formed in a cylindrical form so as to be symmetric with respect to the axial center line of the frame body, said dummy fin having a shape to fit the outer circumferential surface of the frame body over a surface area larger than that between said frame body and said heat radiation fin,
    a step of disposing upper and lower core electrodes in the frame body so as to be in contact with the inner circumferential wall of the frame body and to respectively oppose the heat radiation fin and the dummy fin.
    a step of respectively connecting movable and stationary electrodes to the heat radiation fin and the dummy fin, and
    a step of applying an electric current to said electrodes sufficient to melt-bond only the heat radiation fin, but not said dummy fin, to the frame body by projection welding, whereby said dummy fin disperses thermal stresses.

2. The method of producing a motor frame according to claim 1, wherein the dummy fin is a block of copper or a copper alloy.

3. The method of producing a motor frame according to claim 1, wherein a flexible conductive material is disposed between the dummy fin and the outer circumferential surface of the frame body so as to be in close-contact therewith.

* * * * *